July 29, 1930.  J. M. ALEXANDER  1,771,456
VEGETABLE CUTTER
Filed May 29, 1929  2 Sheets-Sheet 1
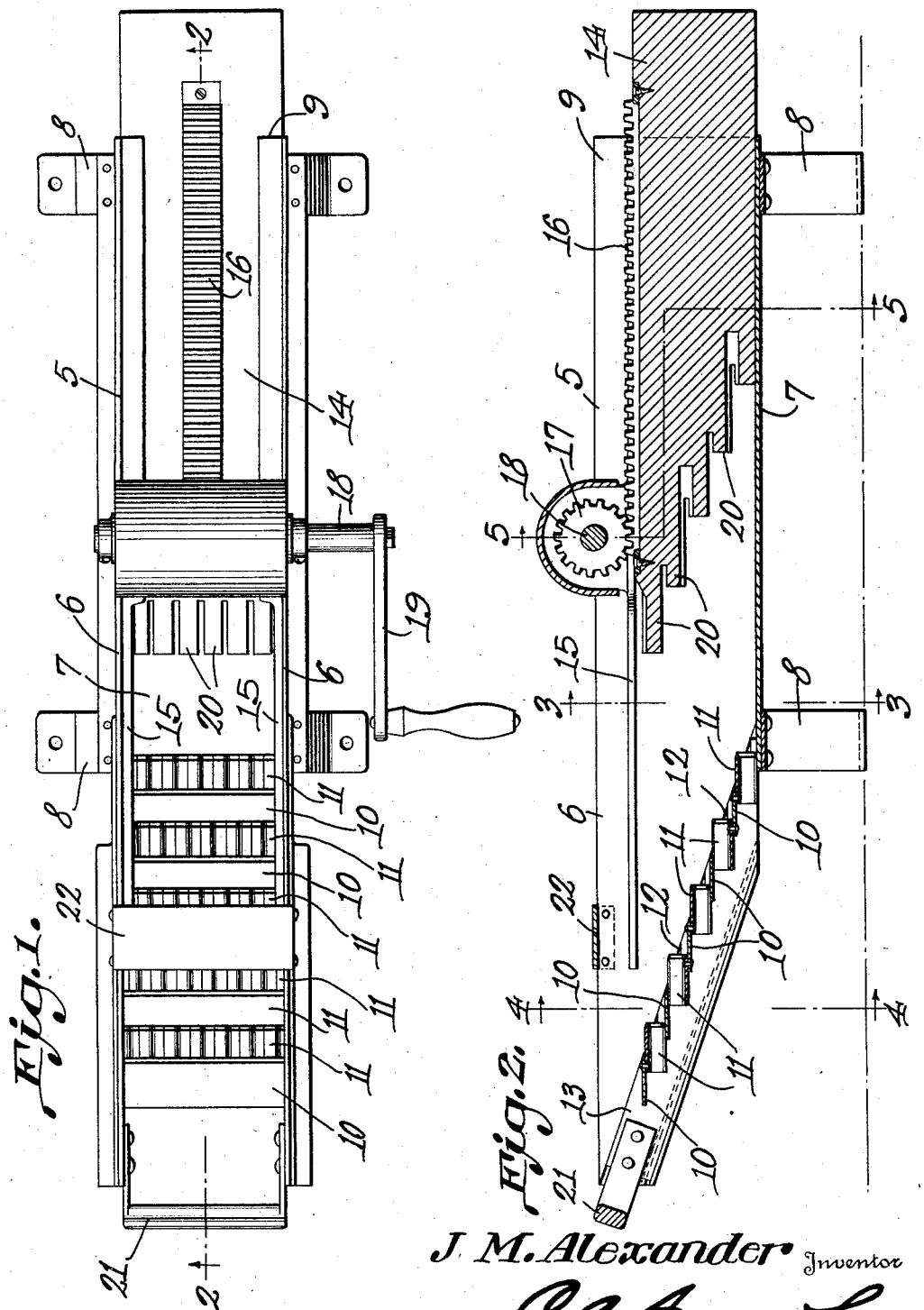

July 29, 1930.   J M. ALEXANDER   1,771,456
VEGETABLE CUTTER
Filed May 29, 1929    2 Sheets-Sheet 2
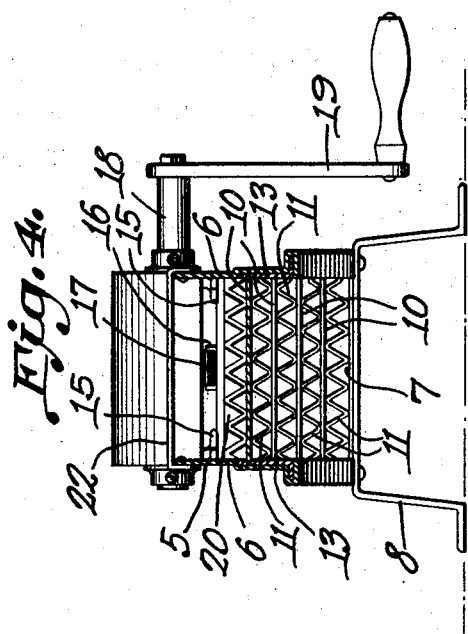
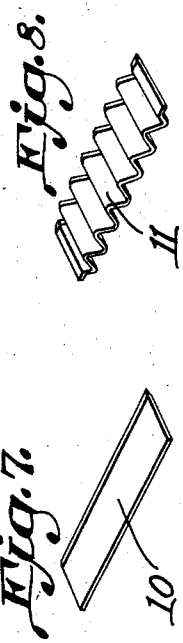
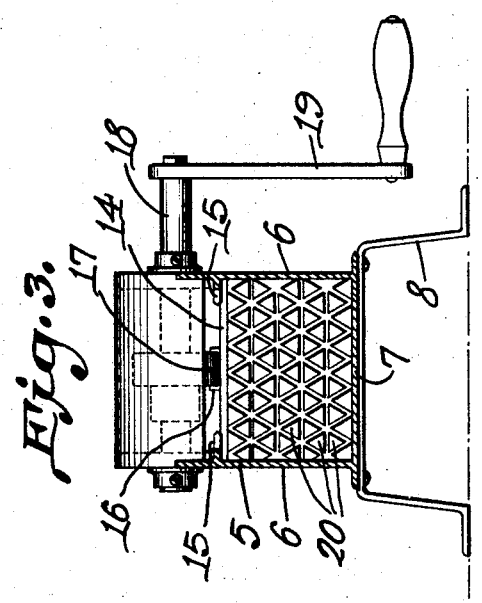
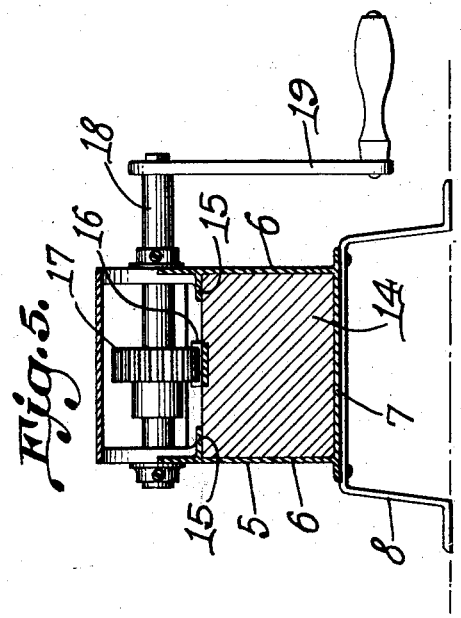
J.M.Alexander Inventor
By C.A.Snow & Co.
Attorneys.

Patented July 29, 1930

1,771,456

UNITED STATES PATENT OFFICE

"J" MONROE ALEXANDER, OF SPANISH FORK, UTAH

VEGETABLE CUTTER

Application filed May 29, 1929. Serial No. 367,000.

This invention relates to vegetable cutters or slicers, and aims to provide a machine of novel construction wherein vegetables such as potatoes may be placed and forced through stationary knives cutting the potatoes into slices for cooking purposes.

An important object of the invention is to provide a machine of this character having blades of a novel construction which will slice the vegetable into slices of a particular shape used in French frying potatoes, thereby insuring an accurate and even cutting of the potato.

Another object of the invention is to provide a machine of this character wherein the follower or plunger of the machine is provided with extensions that pass into the triangular shaped cutting blades to force the slices from the machine after they have been formed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a vegetable slicer constructed in accordance with the invention.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a perspective view of one of the blade supporting bars.

Figure 7 is a perspective view of one of the horizontal blades of the machine.

Figure 8 is a perspective view of the angular blades of the machine.

Referring to the drawings in detail, the machine comprises an elongated body portion indicated generally by the reference character 5 the same comprising side plates 6 and a bottom plate 7 to which the supporting legs 8 are secured whereby the machine may be secured to a supporting surface.

One end of the body portion is open as at 9, the opposite end thereof being closed by the blades of the machine, which blades are so constructed that slices triangular in cross section, will be formed when the vegetables are forced through the blades in a manner to be hereinafter more fully described.

The blades are arranged in pairs, each pair comprising a horizontal flat blade 10 having its forward edge beveled providing a cutting edge. Associated with each blade 10, is a blade 11 which is formed by corrugating a length of sheet metal and beveling the forward edge thereof defining angular blades disposed at oblique angles with respect to the flat blades 10. These blades 10 and 11 have their ends positioned in slots 12 formed in the side plates 13 that are secured to the side plates 6 and disposed at an oblique angle with respect to the upper edges of the plates 6 so that each pair of blades will be offset with respect to the adjacent pair of blades. It might be further stated that these blades 10 and 11 are substantially wide so that the slices cut will be supported throughout their lengths until forced from the machine, thereby eliminating any possibility of the slices being broken after they have been cut.

The plunger or follower which is indicated by the reference character 14, forms an important feature of the invention, and as shown is substantially long and of a width to closely fit within the body portion of the machine to allow it to move freely, but be restricted in its lateral movement.

Guide bars 15 extend inwardly from the side plates of the machine and overlie the upper surface of the follower 14 to hold the follower in alignment with the blades. Secured to the upper surface of the follower is a rack bar 16 which is engaged by the pinion 17 mounted on the shaft 18 which in turn is mounted in suitable bearings formed in the frame of the machine so that as the shaft is rotated as by means of the handle 19, the follower 14 will be moved longitudinally of the body portion of the machine to accomplish the purpose of the invention.

The forward end of the follower 14 is provided with a plurality of transversely spaced fingers 20, the fingers being arranged in rows in vertical spaced relation with each other, the outer ends of the fingers of one row extending beyond the outer ends of the fingers of the adjacent lower row so that the fingers may pass between the angular blades and over the flat blades of the machine. It might be further stated that these fingers are also triangular in cross section so that they will fit closely between the blades.

A handle indicated at 21 is provided at one end of the machine and has connection with the side plates to hold the side plates in proper spaced relation with each other. A brace bar 22 also connects with the side plates to brace them against movement laterally.

In the use of the machine, potatoes or vegetables to be cut into slices for French frying, are placed within the machine and the follower is moved forwardly by the action of the pinion and rack bar, the fingers 20 passing between the blades of the machine and forcing the vegetables through the blades.

The follower is now returned and again moved forwardly after the potatoes to be cut have been dropped into the machine.

From the foregoing it will be obvious that due to the construction shown and described I have provided a machine which will rapidly and accurately cut potatoes or other vegetables in slices of a predetermined size and shape.

I claim:

1. A vegetable slicer including a body portion, a plurality of horizontal cutting blades supported at one end of the body portion, lengths of sheet metal material corrugated to provide obliquely disposed cutting blades disposed directly above the horizontal blades to cut vegetables into slices having a triangular cross section, and a follower operating through the body portion to force articles through the knives.

2. A vegetable slicer including a body portion, said body portion comprising side plates, plates having slots, secured to the side plates, flat horizontal blades having their ends positioned in certain of the slots, a length of sheet metal material comprising angularly disposed blades, supported above each of the horizontal blades, and a follower operating in the body portion to force material through the knives.

3. A vegetable slicer including a body portion, a plurality of horizontal blades arranged at one end of the body portion, angularly disposed blades supported adjacent to each of the first mentioned blades providing triangular passageways, a follower movable within the body portion, fingers extending from the body portion, said fingers being of shapes to fit within the triangular openings to force material through the openings.

In testimony that I claim the foregoing as my own, I have hereto affixed my signature.

"J" MONROE ALEXANDER.